Figure 1:
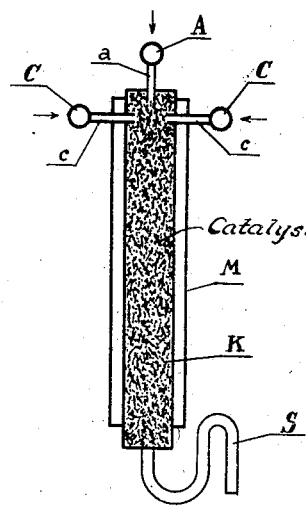

April 5, 1932.   P. ASKENASY ET AL   1,851,970
PROCESS OF CHLORINATING ETHYLENE
Filed June 26, 1930

Inventors:
Paul Askenasy
& Alfred Heller
by Langner, Parry, Card & Langner
Atty's.

Patented Apr. 5, 1932

1,851,970

UNITED STATES PATENT OFFICE

PAUL ASKENASY AND ALFRED HELLER, OF KARLSRUHE, GERMANY

PROCESS OF CHLORINATING ETHYLENE

Application filed June 26, 1930. Serial No. 464,057.

This invention relates to a process of manufacturing ethylene chloride by means of a catalytic accelerating substance which we recognized to be lead or alloys containing much lead in a subdivided state involving a large surface.

Chlorides of metals have already often been used as catalysts for binding ethylene with chlorine, for instance the chlorides of copper, antimony, iron, etc., also activated carbon, but in using it, simultaneously with the reaction of the addition often a considerable substitution takes place, and even under certain circumstances the percentage of the products of the substitution formed surpasses that of the product of the addition, i. e. the ethylene chloride.

On the other hand, we have found that, by introducing a mixture of ethylene and chlorine in a concentrated form or dilute with an indifferent gas into a catalyst consisting of lead in a sufficiently subdivided state, ethylene chloride is produced with only slight quantities of products of substitution. Thereby the temperature of the reacting mixture may vary to a fairly large extent, which we consider to be a great advantage because it is difficult to maintain a fixed temperature in the usual technical production of ethylene chloride on account of its considerable heat of formation.

Other inventors, in producing ethylene chloride, have thought it necessary to undertake the chlorination in successive stages by mixing first a part of the chlorine with the ethylene and removing the product of chlorination formed, whereupon the chlorination is completed in two further stages executed in the same manner. This way has been recommended especially in using such ethylene mixed with propylene etc. as is produced by cracking heavy petroleum oils, in which case it was established that firstly butylene and propylene, and only in the last stage ethylene is chlorinated, and for this last stage it has been found necessary to maintain a temperature of 100° C.

In contradistinction to this we have found that, if as catalyst sufficiently subdivided lead is present, we can mix entirely the whole ethylene and the whole chlorine from the start, which means a considerable saving of labor and which greatly diminishes the amount of care otherwise required. Besides we work so as to maintain at the beginning of the reaction a higher temperature in the top of the reaction chamber which then sinks corresponding to the natural conditions in the course of the reaction, whereas other inventors believe that the reverse course of operation should be followed. Furthermore, we conduct the reacting gases and the reaction product itself in one and the same direction from above downwards, in which case, as mentioned, it is not required, in contrast to the known manner, to pay great attention to a constant temperature and we never let it rise to 100° C. which temperature other inventors considered to be obligatory in producing ethylene chloride.

Figure 2:
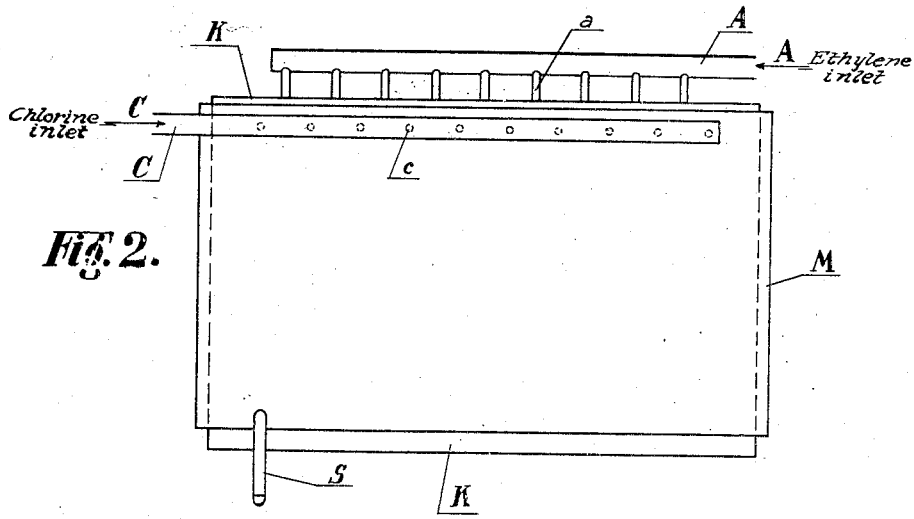

All this enables us to execute the whole reaction in one single reaction chamber with an apparatus of very simple construction, of which the following is a description:

K is a narrow and long reaction chamber with walls of lead or any other suitable metal or of ceramic material, Fig. 1 representing the section, Fig. 2 the view onto the long side. It is entirely filled with lead-shreds or leadwool. The lead may be replaced by an alloy containing much lead. Sufficient room must be left between the particles of the lead catalyst for the gases and vapors to enter and to escape. The ethylene is introduced through pipe A and its connections a, the chlorine through pipe C and its connections c in a constant or broken stream, so that the gases mix together inside the catalyst, whereby their chemical union takes place, the lead working as catalyst. The heat of reaction may be removed by cooling the walls of the reaction chamber from outside by a waterjacket M, or from inside by introducing cooling tubes into the catalyst, or by mixing indifferent gases with the reacting gases or using for instance a diluted ethylene.

We introduce the gases into the catalyst at such a speed that the temperature in the upper third part of the reaction chamber does never exceed 50° C., but this is not indispensable. We may also work at a higher or a lower temperature but in any case the same must be kept below 100° C. We found that it is especially favorable to work between 30 and 45° C.

We have produced in 24 hours 300 kilograms of ethylene chloride accompanied by a small quantity of other products of chlorination in an apparatus 3 meters long, 3 centimeters wide and 1 meter high. The liquid ethylene chloride collecting underneath flows off through the siphon S. The ethylene chloride produced can be separated from the accompanying other products of chlorination and refined by distillation and fractionating.

It is well known that, by adding chlorine to unsaturated compounds, also products of substitution are formed simultaneously and that it is thus advisable not to use too much chlorine. We have found that, in using lead as catalyst, the amount of the products of substitution remains inconsiderable and the output in ethylene chlorine is quite satisfactory even if we use a little more chlorine than prescribed by the theory.

It is not absolutely necessary to mix both the gases inside the catalyst; they may also be mixed partly or entirely immediately before reaching the catalyst.

Further it has been found that the formation, on the surface of the catalyst, of a coating of a chlorination product of the metal used does not sensibly influence the course of the reaction.

What we claim is:—

1. A process of producing ethylene dichloride from ethylene and chlorine by conducting said gases through a catalyst consisting substantially of lead in a subdivided state.

2. A process of producing ethylene dichloride from ethylene and chlorine by conducting said gases through a catalyst consisting substantially of lead in a subdivided state, the gases to be combined being mixed immediately on their contact with the catalyst.

3. A process of producing ethylene dichloride from ethylene and chlorine by conducting said gases through a catalyst consisting substantially of lead in a subdivided state, the gases to be combined being mixed immediately on their contact with the catalyst at the top of one single, narrow, long and high reaction chamber filled with the catalyst, the ethylene and the chlorine being introduced at said top through different inlets situated in juxtaposition.

4. A process of producing ethylene dichloride from ethylene and chlorine by conducting said gases through a catalyst consisting substantially of lead in a subdivided state, the gases to be combined being mixed immediately on their contact with the catalyst at the top of one single, narrow, long and high reaction chamber filled with the catalyst, the ethylene and the chlorine being introduced at said top through different inlets situated in juxtaposition, and the temperature of the reaction chamber being below 100° C.

5. A process of producing ethylene dichloride from ethylene and chlorine by conducting said gases through a catalyst consisting substantially of lead in a subdivided state, the gases to be combined being mixed immediately on their contact with the catalyst at the top of one single, narrow, long and high reaction chamber filled with the catalyst, the ethylene and the chlorine being introduced at said top through different inlets situated in juxtaposition, and the upper third part of the reaction chamber being kept at a temperature not substantially exceeding 50° C.

6. A process of producing ethylene dichloride from ethylene and chlorine by conducting said gases through a catalyst consisting substantially of lead in a subdivided state, the gases to be combined being mixed immediately on their contact with the catalyst at the top of one single, narrow, long and high reaction chamber filled with the catalyst, the ethylene and the chlorine being introduced at said top through different inlets situated in juxtaposition, and the temperature of the reaction chamber being kept below 100° C. by diluting the reacting gases with indifferent gases.

7. A process of producing ethylene dichloride from ethylene and chlorine by conducting said gases through a catalyst consisting substantially of lead in a subdivided state, the gases to be combined being mixed immediately on their contact with the catalyst at the top of one single, narrow, long and high reaction chamber filled with the catalyst, the ethylene and the chlorine being introduced at said top through different inlets situated in juxtaposition, the speed of the gases being regulated so as not to substantially exceed the temperature of 50° C. in the upper third part of the reaction chamber.

8. A process of producing ethylene dichloride from ethylene and chlorine by conducting said gases through a catalyst consisting substantially of lead in a subdivided state, the gases to be combined being mixed immediately on their contact with the catalyst at the top of one single, narrow, long and high reaction chamber filled with the catalyst, the ethylene and the chlorine being introduced at said top through different inlets situated in juxtaposition, the speed of the gases being regulated so as never to reach the temperature of 100° C. in any part of the reaction chamber.

9. A process of producing ethylene dichloride from ethylene and chlorine by conducting said gases through a catalyst consisting substantially of lead in a subdivided state, the gases to be combined being mixed immediately on their contact with the catalyst at the top of one single, narrow, long and high reaction chamber filled with the catalyst, the ethylene and the chlorine being introduced at said top through different inlets situated in juxtaposition, the temperature of the reaction being kept substantially between 30 and 45° C.

10. A process of producing ethylene dichloride from ethylene and chlorine by conducting said gases through a catalyst consisting substantially of lead in a subdivided state, the gases to be combined being mixed immediately on their contact with the catalyst at the top of one single, narrow, long and high reaction chamber filled with the catalyst, the ethylene and the chlorine being introduced at said top through different inlets situated in juxtaposition, and the temperature of the reaction chamber being below 100° C. and dropping from the top to the bottom end of the reaction chamber.

11. A process of producing ethylene dichloride from ethylene and chlorine by conducting said gases through a catalyst consisting substantially of lead in a subdivided state, the gases to be combined being mixed immediately on their contact with the catalyst at the top of one single, narrow, long and high reaction chamber filled with the catalyst, the ethylene and the chlorine being introduced at said top through different inlets situated in juxtaposition, and the ethylene chloride formed being removed from the lower part of the reaction chamber.

12. A process of producing ethylene dichloride from ethylene and chlorine by conducting said gases through a catalyst consisting substantially of lead in a subdivided state, the gases to be combined being mixed immediately on their contact with the catalyst at the top of one single, narrow, long and high reaction chamber filled with the catalyst, the ethylene and the chlorine being introduced at said top through different inlets situated in juxtaposition, and the ethylene chloride formed being removed from the lower part of the reaction chamber, the temperature of the latter being kept below 100° C.

13. A process of producing ethylene dichloride from ethylene and chlorine by conducting said gases through a catalyst consisting substantially of lead in a subdivided state, the gases to be combined being mixed immediately on their contact with the catalyst at the top of one single, narrow, long and high reaction chamber filled with the catalyst, the ethylene and the chlorine being introduced at said top through different inlets situated in juxtaposition, and the ethylene chloride formed being removed from the lower part of the reaction chamber, and refined by distillation and fractionation.

In witness whereof we have hereunto signed our names this 13th day of June, 1930.

PAUL ASKENASY.
ALFRED HELLER.